United States Patent [19]

Ellison

[11] Patent Number: 4,615,934

[45] Date of Patent: Oct. 7, 1986

[54] WARP KNIT WEFT INSERTION FABRIC AND PLASTIC SHEET REINFORCED THEREWITH

[75] Inventor: James R. Ellison, Leesburg, Ind.

[73] Assignee: Peabody ABC Corporation, Warsaw, Ind.

[21] Appl. No.: 800,751

[22] Filed: Nov. 22, 1985

[51] Int. Cl.⁴ .............................................. B32B 7/00
[52] U.S. Cl. ..................................... 428/254; 66/190; 66/192; 66/202; 428/253; 428/246; 428/247; 428/262; 428/297; 428/224
[58] Field of Search ............... 66/190, 192, 202, 84 A, 66/85 A; 428/253, 254, 297, 246, 247, 262

[56] References Cited

U.S. PATENT DOCUMENTS

| 4,443,516 | 4/1984 | Rogers | 428/254 |
| 4,444,822 | 4/1984 | Doyle et al. | 428/254 |
| 4,518,640 | 5/1985 | Wilhems | 428/254 |

Primary Examiner—James J. Bell
Attorney, Agent, or Firm—St. Onge Steward Johnston & Reens

[57] ABSTRACT

A warp knit weft insertion fabric has a plurality of warp yarns and weft insertion yarns of a denier of at least about 1000, each of which yarns is separated from its neighbors by a plurality of yarns of a lower denier of about 220 to about 1800, the ratio of denier of the heavier yarn to lighter yarn being about 1.5 to about 6:1. The arrangement of yarns in both warp and weft is optionally symmetrical, i.e. there are the same number of yarns per inch and the same number and denier of the lighter weight yarns separating the same number and denier of the heavier yarns in both directions. In a particular feature of the invention the yarns in one or both directions are formed in situ by feeding two or more yarns of lower denier in tandem during the knitting process to form a single yarn of higher denier in the finished fabric.

The fabric is employed as a reinforcement for sheet material of thermoplastic synthetic resin (by lamination or coating techniques and the like). The reinforced sheet material so produced has a markedly higher ratio of tear strength to tensile strength than similar reinforced sheet materials hitherto available and is useful in a wide variety of industrial applications including fabrication of mine brattice, mine ventilation tubing and the like.

26 Claims, 2 Drawing Figures

WARP KNIT WEFT INSERTION FABRIC AND PLASTIC SHEET REINFORCED THEREWITH

FIELD OF THE INVENTION

This invention relates to fabric reinforcing materials and plastic sheet materials reinforced therewith and is more particularly concerned with warp knit weft insertion fabrics and sheets of thermoplastic synthetic resin reinforced therewith.

DESCRIPTION OF THE PRIOR ART

Fabric reinforcing materials, and reinforced sheet materials prepared therefrom by lamination or coating techniques and the like, are well-known in the art.

Illustratively, Rund U.S. Pat. No. 1,001,892 shows a reinforced paper fabric for use as a balloon envelope wherein the reinforcement is a woven material having strong threads (no precise strength criteria is given) in both warp and weft.

Diamond U.S. Pat. No. 1,772,458 describes a woven fabric for reinforcement of rubber having a warp composed of cords of relatively large size and a weft of cords of smaller size. The weft threads are not required to sustain any stress in the applications for which the reinforced material is to be used.

Hillas U.S. Pat. No. 3,444,024 teaches a process for preparing a reinforced sheet of thermoplastic resin by heat bonding a layer of thermoplastic resin to a nonwoven scrim composed of at least two layers of essentially parallel spaced apart strands of thread.

Haage et al. U.S. Pat. No. 4,113,907 shows a reinforced thermoplastic resin sheet in which the reinforcing fabric is provided at intervals with regularly spaced, bunched groups of threads in both the warp and weft, the threads being of the same denier throughout.

Sanders U.S. Pat. No. 4,388,364 shows a coated warp knit polyester fabric which has been heat stretched and set prior to coating.

Berczi U.S. Pat. No. 4,425,398 describes the manufacture of a rubberized composite sheet particularly designed for use as a printing blanket. The reinforcing fabric of the sheet comprises a warp knit weft insertion fabric wherein both the warp and weft insertion yarns are of substantially uniform denier although the warp yarns are not necessarily of the same denier as the weft insert yarns.

Rogers U.S. Pat. No. 4,443,516 shows a two-bar fabric for use in reinforcing PVC laminates employed as structural materials for outdoor signs.

It has now been found that reinforced polymeric resin sheet having markedly improved properties, particularly in regard to tear strength, can be produced using as the reinforcing material a warp knit weft inserted fabric of novel construction. The tear strength and related properties of the fabric are at least comparable to those of similar sheets reinforced with markedly more expensive woven fabrics. The properties of the fabrics which can be produced in accordance with this invention are such that they can be employed in a wide variety of industrial applications such as fabrication of tarpaulins, sailcloth, roofing products, mine brattice, mine ventilation tubing and the like which require fabric having outstanding tear strength.

SUMMARY OF THE INVENTION

It is an object of the invention to provide a warp knit weft insertion reinforcing fabric of novel construction.

It is a further object of the invention to provide reinforced polymeric resin sheet having improved tear strength and an improved ratio of tear strength to tensile strength.

It is yet another object of the invention to provide reinforced polymeric resin sheet having tear strength and like properties comparable to those provided by polymeric resin sheets reinforced with woven fabrics but employing markedly less expensive scrim fabrics as the reinforcing material.

A further object of the invention is to provide a novel method of fabricating a warp knit weft insertion reinforcing fabric.

These objects, and other objects of the invention which will become apparent from the detailed description which follows, are achieved by the reinforcing fabrics of the invention, the process for fabricating of the same, and polymeric resin sheets reinforced using said fabrics.

Thus, in one aspect, the invention provides a warp knit, weft inserted fabric which is characterized by having yarns of a relatively high denier, of the order of at least about 1000, in both the warp and the weft, each of which yarns is separated from each of its neighbours by yarns of a lesser denier of the order of about 220 to about 1800, the ratio of denier of the heavier yarns to lighter yarns being about 1.5:1 to about 6:1. The number of yarns of the lower denier separating each of the heavier denier warp yarns is preferably, but not necessarily, equal to the number of yarns of the lower denier separating each of the heavy weft yarns, i.e. the pattern of yarns in the fabric is regular in each of the warp and woof. However, the invention is not limited to fabrics which are balanced in this manner. Thus the fabrics of the invention can have unsymmetrical arrangements of yarns in the warp and the weft in which, for example, the number and denier of the lighter yarns in the warp differ from those in the weft and the denier of the heavier yarns in the warp differs from that of those in the weft.

Fabric having the above characteristics can be prepared by conventional warp knit weft insertion procedures. In a novel feature of the invention, to be discussed further below, the yarns of heavy denier can be "machine plied" i.e. can be formed in situ during the fabrication process by feeding two or more lighter denier yarns in tandem through the normal yarn path leading to the warp knit machine.

The invention also comprises polymeric resin sheet having the above warp knit weft insertion fabric as reinforcement. The fabric reinforcement can be incorporated into the sheet by coating or laminating procedures and the like well known in the art.

DETAILED DESCRIPTION OF THE INVENTION

Figure 1:
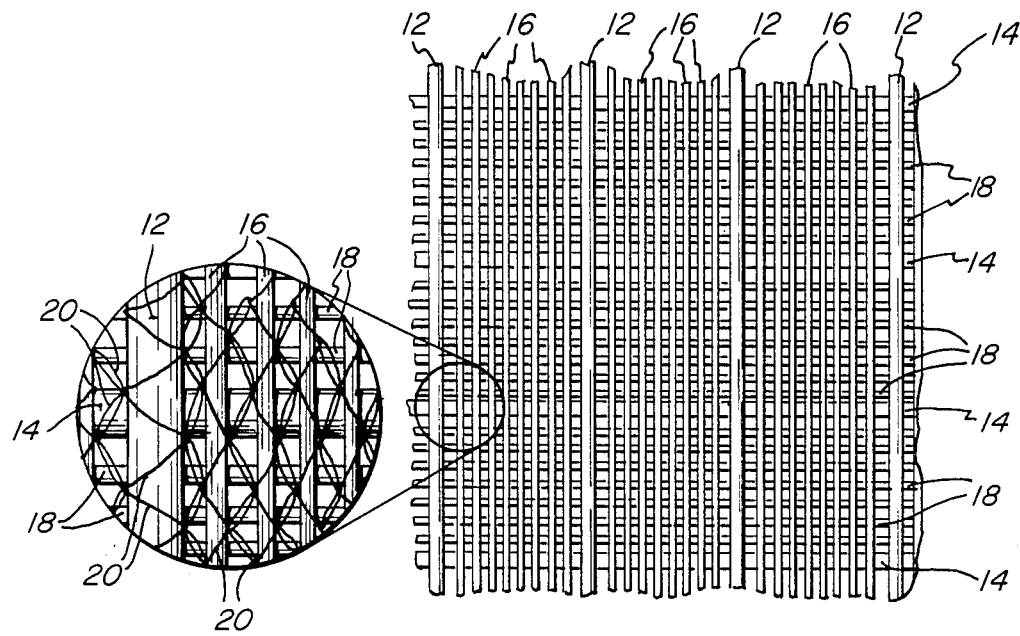
FIG. 1 shows a plan view of a typical warp knit weft insertion fabric of the invention with a small section thereof shown in magnified form.

The invention in its various aspects will now be described with reference to the drawings. The warp knit insertion fabric shown in plan view in FIG. 1 is a section of a typical fabric of the invention. The warp yarns 12 are of relatively heavy denier and are separated from each other by eight warp yarns 16 of lighter denier. Similarly the weft insertion yarns 14 are of relatively heavy denier and are separated from each other by eight yarns 18 of lighter denier. As shown more clearly in the magnified section offset from FIG. 1, the various warp and weft yarns are held in spaced apart relationship by the much finer knitting yarn 20 which has a denier of about 30 to about 90.

The heavier denier yarns 12 and 14 can be of equal or different denier and each has a denier within the range of about 500 to about 6000, and preferably within the range of about 1000 to about 5200. The lighter denier yarns 16 and 18 can also be equal or different in denier and each has a denier within the range of about 220 to about 1800, provided that the ratio of denier of the heavier yarns 12 and 14 to that of the lighter yarns 16 and 18 is within the range of about 1.5 to about 6:1. While the number of lighter weight yarns 16 and 18 which separate each of the heavier weight warp yarns 12 and weft yarns 14 is shown as eight in FIG. 1 the invention is not limited to such a number nor is it limited to fabrics wherein the number of lighter yarns separating each of the heavier yarns is the same in both the warp and weft directions. Thus, fabrics in accordance with the invention can have as few as 1 and as many as 24 lower denier yarns separating the higher denier yarns in both the warp and the weft, the number in the warp direction being preferably, but not necessarily, equal to the number in the weft direction.

The number of yarns per inch in both the warp and the weft can vary over a wide range, being limited only by the capabilities of the machine used in fabrication, and is advantageously of the order of about 1 to about 25 yarns per inch and, preferably, of the order of about 6 to about 18 per inch.

The yarns employed in both the warp and the weft, whatever the particular denier employed, can be the same or different and are selected independently from homogeneous yarns, plied, and "machine-plied" yarns. The latter type of yarns are homogeneous yarns which have been plied during the knitting process as will be discussed below. The yarns can be natural yarns but are preferably fabricated from synthetic materials such as polyesters and polyamides, such as nylon, dacron, aramids, Kevlar ®, and the like, carbon fibers, fiber-glass, rayon, cotton and the like. Particularly preferred yarns for use in the fabric of the invention are polyester yarns.

As previously mentioned, the fabrics of the invention, of which that shown in plan view in FIG. 1 is typical, can be prepared using conventional warp knit machinery by feeding the appropriate arrangement and weights of yarn in both the warp and weft. Where the yarns, particularly the heavier yarns in both warp and weft, are to be "machine plied" this also can be accomplished using conventional warp knit machinery using the following procedure. For the yarns in the weft direction, spools of yarn, of a lesser mass than that in the desired machine-plied yarn but such that the total mass of the yarns equals that of the desired yarn, are loaded in a creel. The yarns are then threaded (in tandem or in whatever combination is necessary to achieve the desired mass in the "machine-plied" yarn) through the normal yarn path, i.e. through tension posts, thread guide rails, weft carriage, displacement rakes, around weft transport hooks (on a transport chain) and into the knitting elements. Similarly, in the case of the yarns in the warp direction the appropriate beam containing yarns of the lesser mass (having a total mass which will equal the desired level in the machine plied yarn) is selected and, having determined the appropriate grid sizing and spacing, the yarns are threaded (in tandem or whatever combination is necessary to achieve the desired mass in the "machine-plied" yarn) through the normal yarn path, i.e. through guide bars, warp feed rolls, and thread guides and into the knitting elements.

As will be appreciated by one skilled in the art, the production of the yarns of desired denier or mass by machine plying in the above manner enables one to change from producing one particular fabric of the invention to another without any prolonged down time of the knitting machinery such as is the case where plied yarn is being employed. Further, machine plying of yarns in the above manner leads to significant reduction in cost compared to the use of conventional plied yarn which has a cost of about 50 U.S. cents per pound.

Figure 2:
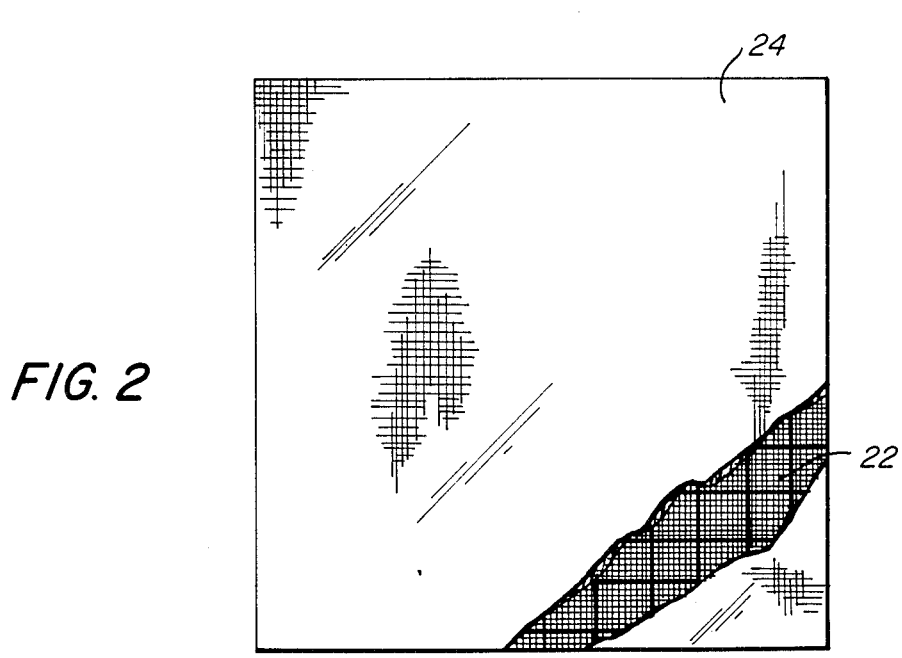
FIG. 2 shows a plan view of a typical reinforced polymeric resin sheet with a portion of the top layer peeled off to show the reinforcing layer.

In FIG. 2 there is illustrated in plan view a typical reinforced polymeric resin sheet 24 in accordance with the invention. The reinforcing fabric, in the particular embodiment shown, is the warp knit weft insertion fabric 22 a portion of which is seen in the cutaway portion of the sheet 24. The polymeric resin can be any of the resins commonly employed in preparing such sheets. Illustrative of such polymeric resins are polyvinyl chloride, polyvinyl fluoride, polyurethane, ABS, polyamides such as nylon, dacron and the like, polyethylene, Mylar ®, and the like. The reinforcing fabric 22 can be incorporated in the polymeric resin by any of the conventional techniques such as lamination, i.e. heat bonding the reinforcing fabric between two sheets of the polymeric resin, coating the fabric with the molten polymeric resin and like techniques. The thickness of the sheets so produced can vary widely depending upon the application to which the sheet is to be put. Advantageously, the sheets have a thickness of the order of about 0.0025 to about 0.025 inches.

In further illustration of the warp knit weft insertion fabrics of the invention and polymeric resin sheets reinforced therewith, a series of warp knit weft insertion fabrics having the following configurations was manufactured using a Copcentra Automatic Warp Knitting machine supplied by American Liba Incorporated, Piedmont, S.C. The yarns used in all samples were of polyester [Fortrel ®: Celanese].

1. 9×9 yarns per inch having 8 yarns in each direction of 1000 denier, and the ninth yarn in each direction of 1800 denier.

2. 9×9 yarns per inch having 8 yarns in each direction of 1000 denier and the ninth yarn in each direction of 3600 denier produced by "machine plying" as described above.

3. 6×6 yarns per inch with 5 yarns in each direction of 1000 denier and the sixth yarn in each direction of 1800 denier.

4. 6×6 yarns per inch with 5 yarns in each direction of 1000 denier and the sixth yarn in each direction of 3600 denier produced by "machine plying" as described above.

Each of the above fabrics was then employed as the substrate for a laminated polyvinyl chloride sheet by bonding calendered polyvinyl chloride sheet (3 mls. thickness) to each side of the substrate using a combination of heat, pressure and adhesive. The four reinforced polyvinyl chloride sheets so produced had the following properties:

| Sheet # | Tensile Strength (lbs.) | | Tear Strength (lbs.) | |
|---|---|---|---|---|
| | Warp | Weft | Warp | Weft |
| 1 | 254 | 244 | 67 | 59 |
| 2 | 271 | 260 | 105 | 89 |
| 3 | 155 | 145 | 55 | 45 |
| 4 | 190 | 185 | 81 | 75 |

1. Tested by Federal Test Method Standard (FTMS) 191, Textile Test Method 5100.
2. Tested by FTMS, Textile Test Method 5136.

As set forth above, the reinforced polymeric resin sheets prepared in accordance with the invention are characterized by excellent tear strength and an increased ratio of tear strength to tensile strength as compared with polymeric resin sheets reinforced with warp knit fabrics hitherto available. This renders the reinforced polymeric resin sheets of the invention useful in a wide variety of applications particularly in regard to fabrication of tarpaulins, sailcloth, roofing products, mine ventilation shafts, mine brattice and the like.

While the invention has been illustrated above by reference to certain embodiments it is to be understood that these have been given for purposes of illustration only and are not to be construed as limiting the scope of the invention. The latter is defined only by the claims which are set forth hereinafter.

I claim:

1. A warp knit weft inserted fabric having a plurality of warp and weft insert yarns of a denier in the range of about 500 to about 6000, each of said warp and said weft insert yarns being separated from its neighbours by a plurality of yarns of a lower denier in the range of about 220 to about 1800, the ratio of denier of the heavier yarns to that of the lighter yarns being in the range of about 1.5:1 to about 6:1.

2. A warp knit weft inserted fabric in accordance with claim 1 wherein the number of yarns of lower denier separating each of the warp yarns of higher denier is from about 1 to about 24.

3. A warp knit weft inserted fabric in accordance with claim 1 wherein the number of yarns of lower denier separating each of the weft insert yarns of higher denier is from about 1 to about 24.

4. A warp knit weft inserted fabric in accordance with claim 1 wherein the number of yarns of lower denier separating each of the warp and weft yarns of higher denier are equal and said yarns are uniformly disposed throughout said fabric.

5. A warp knit weft inserted fabric in accordance with claim 1 wherein the heavier yarns in both the warp and the weft have a denier within the range of about 1000 to about 5200.

6. A warp knit weft inserted fabric in accordance with claim 1 wherein there are 9 yarns per inch in both the warp and the weft of which every ninth yarn in each direction is of the higher denier and the other 8 yarns are of the lower denier.

7. A warp knit weft inserted fabric in accordance with claim 1 wherein there are 6 yarns per inch in both the warp and the weft of which every sixth yarn in each direction is of the higher denier and the other 8 yarns are of the lower denier.

8. A warp knit weft inserted fabric in accordance with claim 1 wherein the yarns employed in the warp and the weft comprise plied yarns having a denier within the stated range.

9. A warp knit weft inserted fabric in accordance with claim 1 wherein the yarns employed in the warp and the weft comprise yarns having a denier within the stated range formed by uniting a plurality of yarns of lower denier into a single yarn in situ during the knitting of the fabric.

10. A warp knit weft inserted fabric comprising from about 1 to about 25 yarns per inch in both the warp and weft at least one of said yarns per inch in each direction having a denier in the range of about 500 to about 6000, the remainder of said yarns in each direction having a denier in the range of about 220 to about 1800, the yarns of higher denier in each direction being separated each from the other by an equal number of yarns of the lower denier, the ratio of denier of the heavier yarns to that of the lighter yarns being in the range of about 1.5:1 to about 6:1.

11. A warp knit weft inserted fabric in accordance with claim 10 wherein there are an equal number of yarns per inch in both the warp and the weft and there are an equal number of yarns of higher denier per inch in each of the warp and the weft.

12. A warp knit weft insert fabric in accordance with claim 11 wherein there are 9 yarns per inch in each of the warp and weft and wherein every 9th yarn in both the warp and the weft is of the higher denier, the remainder of the yarns having the lower denier.

13. A warp knit weft insert fabric in accordance with claim 10 wherein there are 6 yarns per inch in the warp every 6th yarn being of the higher denier and there are 6 yarns per inch in the weft every 6th yarn being of the higher denier, the remainder of the yarns in both warp and weft being of the lower denier.

14. A warp knit weft inserted fabric in accordance with claim 10 wherein the yarns in the warp and the weft comprise yarns having a denier within the stated range formed by uniting a plurality of yarns of lower denier into a single yarn in situ during the knitting of the fabric.

15. A fabric reinforced sheet of thermoplastic synthetic resin wherein the fabric reinforcement comprises a warp knit weft inserted fabric having a plurality of warp and weft insert yarns of a denier of about 500 to about 6000, each of said warp and said weft insert yarns being separated from its neighbors by a plurality of yarns of a lower denier in the range of about 220 to about 1800, the ratio of denier of the heavier yarns to that of the lighter yarns being in the range of about 1.5:1 to about 6:1.

16. A fabric reinforced sheet of thermoplastic synthetic resin in accordance with claim 15 wherein the number of yarns of lower denier separating each of the warp yarns of higher denier is from about 1 to about 24.

17. A fabric reinforced sheet of thermoplastic synthetic resin in accordance with claim 15 wherein the number of yarns of lower denier separating each of the weft insert yarns of higher denier is from about 1 to about 24.

18. A fabric reinforced sheet of thermoplastic synthetic resin in accordance with claim 15 wherein the number of yarns of lower denier separating each of the warp yarns of higher denier and the number of yarns of lower denier separating each of the weft insert yarns are equal and said yarns are uniformly disposed throughout said fabric reinforcement.

19. A fabric reinforced sheet of thermoplastic synthetic resin in accordance with claim 15 wherein the heavier yarns in both the warp and the weft have a denier within the range of about 1000 to about 5200.

20. A fabric reinforced sheet of thermoplastic synthetic resin in accordance with claim 15 wherein there are 9 yarns per inch in both the warp and the weft of which every ninth yarn in each direction is of the higher denier and the other 8 yarns are of the lower denier.

21. A fabric reinforced sheet of thermoplastic synthetic resin in accordance with claim 15 wherein there are 6 yarns per inch in both the warp and the weft of which every sixth yarn in each direction is of the higher denier and the other 5 yarns are of the lower denier.

22. A fabric reinforced sheet of thermoplastic synthetic resin in accordance with claim 15 wherein the yarns employed in the warp and the weft comprise yarns having a denier within the stated range formed by uniting a plurality of yarns of lower denier into a single yarn in situ during the knitting of the fabric.

23. A fabric reinforced sheet of thermoplastic synthetic resin in accordance with claim 15 wherein said synthetic resin is polyvinyl chloride.

24. A fabric reinforced sheet of thermoplastic synthetic resin in accordance with claim 23 wherein said fabric reinforcement is laminated between two sheets of polyvinyl chloride.

25. A fabric reinforced sheet of thermoplastic synthetic resin in accordance with claim 15 wherein said fabric reinforcement is coated with a layer of said thermoplastic synthetic resin.

26. A fabric reinforced sheet of thermoplastic synthetic resin in accordance with claim 25 wherein said thermoplastic synthetic resin is polyvinyl chloride.

* * * * *